(12) United States Patent
Fan

(10) Patent No.: US 12,145,958 B2
(45) Date of Patent: Nov. 19, 2024

(54) PHOSPHINIMIDE CATALYSTS FOR OLEFIN POLYMERIZATION

(71) Applicant: NOVA CHEMICALS (INTERNATIONAL) S.A., Fribourg (CH)

(72) Inventor: Cheng Fan, Calgary (CA)

(73) Assignee: NOVA Chemicals (International) S.A., Fribourg (CH)

(*) Notice: Subject to any disclaimer, the term of this patent is extended or adjusted under 35 U.S.C. 154(b) by 636 days.

(21) Appl. No.: 17/601,650

(22) PCT Filed: Mar. 31, 2020

(86) PCT No.: PCT/IB2020/053058
§ 371 (c)(1),
(2) Date: Oct. 5, 2021

(87) PCT Pub. No.: WO2020/208472
PCT Pub. Date: Oct. 15, 2020

(65) Prior Publication Data
US 2022/0162242 A1    May 26, 2022

(30) Foreign Application Priority Data
Apr. 8, 2019   (CA) ................... CA 3039379

(51) Int. Cl.
*C07F 9/02* (2006.01)
*C07F 9/6506* (2006.01)
*C08F 4/6592* (2006.01)
*C08F 210/16* (2006.01)

(52) U.S. Cl.
CPC ........ *C07F 9/65068* (2013.01); *C08F 210/16* (2013.01)

(58) Field of Classification Search
CPC . C08F 2420/04; C08F 4/6592; C07F 9/65068
See application file for complete search history.

(56) References Cited

U.S. PATENT DOCUMENTS

| | | | |
|---|---|---|---|
| 5,589,555 A | 12/1996 | Zboril et al. | |
| 6,234,950 B1 * | 5/2001 | von Haken Spence | C08F 10/02<br>502/103 |
| 6,372,864 B1 * | 4/2002 | Brown | C08F 10/02<br>526/127 |
| 6,777,509 B2 * | 8/2004 | Brown | C08F 10/00<br>526/170 |
| 8,987,393 B2 * | 3/2015 | Van Doremaele | C08F 4/76<br>502/103 |
| 2014/0296458 A1 * | 10/2014 | Van Doremaele | C08F 4/52<br>502/103 |
| 2016/0102161 A1 * | 4/2016 | Cruz | C08F 110/02<br>502/118 |

FOREIGN PATENT DOCUMENTS

| | | | |
|---|---|---|---|
| CA | 2820501 A1 * | 12/2014 | ............. C07F 17/00 |
| EP | 1135421 B1 | 1/1999 | |
| WO | WO2005014601 A2 | 2/2005 | |

OTHER PUBLICATIONS

Hollink; Group IV phosphinimide complexs in catalysis (Year: 2003).*
Gibon et al; Chem. Rev. 103, pp. 283-315 (Year: 2003).*
Huergo et al; Inorganic Chemistry; 59, pp. 15262-15275 (Year: 2020).*
Pangborn, Amy B., et al. "Safe and Convenient Procedure for Solvent Purification", Organometallics 1996, 15, 1518-1520, 3 pages.
Designation: D6474-12; "Standard Test Method for Determining Molecular Weight Distribution and Molecular Weight Averages of Polyolefins by High Temperature Gel Permeation Chromatography", ASTM International, Oct. 16, 2019, 6 pages.
Designation: D6645-01 (Reapproved 2010); "Standard Test Methods for Methyl (Comonomer) Content in Polyethylene by Infrared Spectrophotometry", ASTM International, dated Jan. 1, 2010 (originally approved 2001), 4 pages.
International Search Report and Written Opinion corresponding to PCT Application No. PCT/IB2020/053058, dated Jun. 26, 2020, 8 pages.

* cited by examiner

*Primary Examiner* — Karuna P Reddy
(74) *Attorney, Agent, or Firm* — Thomas J. Styslinger

(57) ABSTRACT

A phosphinimide catalyst system comprises: i) a phosphinimide pre-polymerization catalyst having a cyclopentadienyl ligand and a phosphinimide ligand which is substituted with a guanidinate type group; and ii) a catalyst activator. The catalyst system polymerizes ethylene with an alpha-olefin to give high molecular weight ethylene copolymer.

24 Claims, No Drawings

PHOSPHINIMIDE CATALYSTS FOR OLEFIN POLYMERIZATION

CROSS-REFERENCE TO RELATED PATENT APPLICATIONS

This application is a U.S. National Phase Application under 35 U.S.C. § 371 of PCT/IB2020/053058, filed on Mar. 31, 2020, which claims the benefit of priority to Canadian Patent Application No. 3039379, filed on Apr. 8, 2019, both of which are incorporated herein by reference in their entirety.

TECHNICAL FIELD

A new group 4 transition metal polymerization catalyst, one which bears a cyclopentadienyl type ligand and a phosphinimide ligand substituted with a guanidinate type group, polymerizes ethylene with an alpha-olefin to produce ethylene copolymers having high molecular weight.

BACKGROUND ART

The use of heteroatom substituted phosphinimide ligands to support group 4 transition metal catalysts has been explored previously. In U.S. Pat. No. 6,234,950, it was shown that when a phosphinimide ligand was substituted by three dimethyl amido groups (i.e. —N=P(NMe$_2$)$_3$) and used in combination with a cyclopentadienyl ligand in the coordination sphere of titanium, a useful olefin polymerization catalyst was produced. When suitably activated, the species CpTi(N=P(NMe$_2$)$_3$)Me$_2$ copolymerized ethylene with 1-octene at 160° C. at an activity, $k_p$ of up to 648 L/mmol·min in the solution phase, where the polymerization activity is defined as:

$$k_p = \left(\frac{Q}{100-Q}\right)\left(\frac{1}{[Ti]}\right)\left(\frac{1}{HUT}\right),$$

where Q is ethylene conversion (%), [Ti] is catalyst concentration in the reactor (in mmol/L), and HUT is hold-up time of the catalyst in the reactor.

SUMMARY OF INVENTION

We now report a novel group 4 transition metal pre-polymerization catalyst which is ligated by a phosphinimide ligand which bears an electron rich guanidinate type group.

An embodiment of the disclosure is a phosphinimide pre-polymerization catalyst having the following structure:

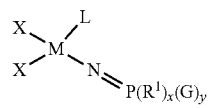

wherein M is Ti, Zr or Hf; P is phosphorus; N is nitrogen; L is a cyclopentadienyl type ligand; each X is independently an activatable ligand; R$^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group having the following structure:

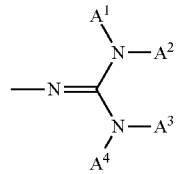

where A$^1$, A$^2$, A$^3$, and A$^4$ are independently hydrogen, an acyclic or a cyclic hydrocarbyl group, or an acyclic or a cyclic heteroatom containing hydrocarbyl group, and where any of A$^1$ to A$^4$ may be part of a cyclic hydrocarbyl group or a cyclic heteroatom containing hydrocarbyl group; x is 0, 1, or 2; y is 3, 2, or 1; and x+y=3.

In an embodiment of the disclosure, L is a cyclopentadienyl ligand.

In an embodiment of the disclosure, G is a guanidinate type group selected from the following structures:

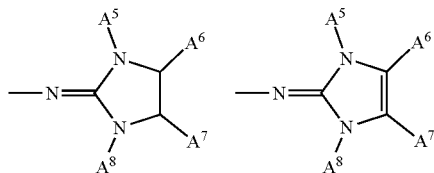

where A$^5$, A$^6$, A$^7$, and A$^8$ are independently a hydrogen, an acyclic or a cyclic hydrocarbyl group, or an acyclic or a cyclic heteroatom containing hydrocarbyl group, and where any of A$^5$, A$^6$, A$^7$, and A$^8$ may be part of a cyclic hydrocarbyl group or a cyclic heteroatom containing hydrocarbyl group.

In an embodiment of the disclosure, A$^5$ and A$^8$ are alkyl groups.

In an embodiment of the disclosure, A$^6$ and A$^7$ are part of a cyclic hydrocarbyl group.

In an embodiment of the disclosure, G is a guanidinate type group having the following structure:

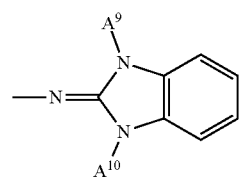

where A$^9$ and A$^{10}$ are independently a hydrogen, an acyclic or a cyclic hydrocarbyl group or an acyclic or a cyclic heteroatom containing hydrocarbyl group.

In an embodiment of the disclosure, A$^9$ and A$^{10}$ are each alkyl groups.

In an embodiment of the disclosure, A$^9$ and A$^{10}$ are isopropyl groups.

In an embodiment of the disclosure, R$^1$ is independently a hydrocarbyl group which is unsubstituted or substituted with one or more halogen atom.

In an embodiment of the disclosure, R$^1$ is a tert-butyl group.

In an embodiment of the disclosure, M is Ti.

An embodiment of the disclosure is a polymerization catalyst system comprising: i) a phosphinimide pre-polymerization catalyst having the following structure:

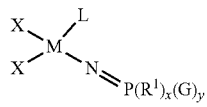

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group having the following structure:

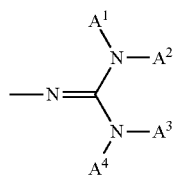

where $A^1$, $A^2$, $A^3$, and $A^4$ are independently hydrogen, an acyclic or a cyclic hydrocarbyl group, or an acyclic or a cyclic heteroatom containing hydrocarbyl group, and where any of $A^1$ to $A^4$ may be part of a cyclic hydrocarbyl group or a cyclic heteroatom containing hydrocarbyl group; x is 0, 1, or 2; y is 3, 2, or 1; and x+y=3; and ii) a catalyst activator.

An embodiment of the disclosure is a polymerization process comprising polymerizing ethylene optionally with one or more $C_{3-12}$ alpha olefins in the presence of a polymerization catalyst system comprising: i) a phosphinimide pre-polymerization catalyst having the following structure:

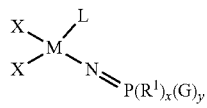

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group having the following structure:

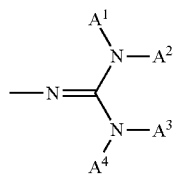

where $A^1$, $A^2$, $A^3$, and $A^4$ are independently hydrogen, an acyclic or a cyclic hydrocarbyl group, or an acyclic or a cyclic heteroatom containing hydrocarbyl group, and where any of $A^1$ to $A^4$ may be part of a cyclic hydrocarbyl group or a cyclic heteroatom containing hydrocarbyl group x is 0, 1, or 2; y is 3, 2, or 1; and x+y=3; and ii) a catalyst activator.

In an embodiment of the disclosure, a polymerization process is a solution phase polymerization process carried out in a solvent.

In an embodiment of the disclosure, a polymerization process comprises polymerizing ethylene with one or more $C_{3-12}$ alpha olefins.

In an embodiment of the disclosure, a polymerization process comprises polymerizing ethylene with 1-octene.

DESCRIPTION OF EMBODIMENTS

The phosphinimide catalyst or complex described herein, usually require activation by one or more cocatalytic or activator species in order to provide polymer from olefins. Hence, an un-activated phosphinimide catalyst or complex may be described as a "pre-polymerization catalyst".

A phosphinimide catalyst is a compound (typically an organometallic compound) based on a group 3, 4 or 5 metal and which is characterized as having at least one phosphinimide ligand. Any compounds/complexes having a phosphinimide ligand and which display catalytic activity for ethylene (co)polymerization may be called "phosphinimide catalysts".

The phosphinimide catalyst employed in the present disclosure is one having a cyclopentadienyl type ligand and a phosphinimide ligand which is further substituted by a guanidinate type group or moiety.

The phosphinimide pre-polymerization catalyst may be used in combination with further catalyst components such as but not limited to one or more than one support, one or more than one catalyst activator and one or more than one catalyst modifier.

The phosphinimide pre-polymerization catalyst used in an embodiment of the disclosure is defined by the following structure:

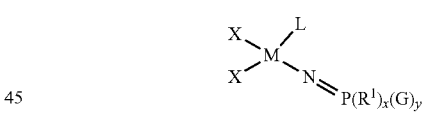

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group; x is 0, 1, or 2; y is 3, 2, or 1; and x+y=3.

The phosphinimide pre-polymerization catalyst used in an embodiment of the disclosure is defined by the following structure:

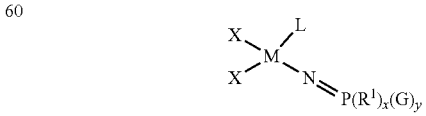

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group having the following structure:

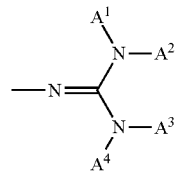

where $A^1$, $A^2$, $A^3$, and $A^4$ are independently hydrogen, an acyclic or a cyclic hydrocarbyl group, or an acyclic or a cyclic heteroatom containing hydrocarbyl group, and where any of $A^1$ to $A^4$ may be part of a cyclic hydrocarbyl group or a cyclic heteroatom containing hydrocarbyl group; x is 0, 1, or 2; y is 3, 2, or 1; and x+y=3.

The phosphinimide pre-polymerization catalyst used in an embodiment of the disclosure is defined by the following structure:

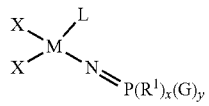

wherein M is Ti, Zr or Hf; P is phosphorus; N is nitrogen; L is a cyclopentadienyl type ligand; each X is independently an activatable ligand; $R^1$ is independently selected from a hydrogen atom; a $C_{1-30}$ hydrocarbyl group which is unsubstituted or substituted with one or more halogen atom; a $C_{1-8}$ alkoxy group; a $C_{6-10}$ aryl group; a $C_{6-10}$ aryloxy group; an amido group of formula $—N(R^A)_2$, wherein the $R^A$ groups are independently selected from a hydrogen atom, a $C_{1-30}$ alkyl group, a $C_{6-10}$ aryl group; a silyl radical of formula $—Si(R^S)_3$, wherein the $R^S$ groups are independently selected from a hydrogen atom, a $C_{1-8}$ alkyl or alkoxy group, a $C_{6-10}$ aryl group, a $C_{6-10}$ aryloxy group; or a germanyl radical of formula $—Ge(R^G)_3$, wherein the $R^G$ groups are independently selected from, a hydrogen atom, a $C_{1-8}$ alkyl or alkoxy radical, a $C_{6-10}$ aryl radical, a $C_{6-10}$ aryloxy radical; G is a guanidinate type group having the following structure:

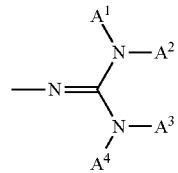

where $A^1$, $A^2$, $A^3$, and $A^4$ are independently hydrogen, an acyclic or a cyclic hydrocarbyl group, or an acyclic or a cyclic heteroatom containing hydrocarbyl group, and where any of $A^1$ to $A^4$ may be part of a cyclic hydrocarbyl group or a cyclic heteroatom containing hydrocarbyl group; x is 0, 1, or 2; y is 3, 2, or 1; and x+y=3.

The phosphinimide pre-polymerization catalyst used in an embodiment of the disclosure is defined by the following structure:

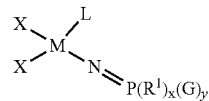

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group selected from the group comprising:

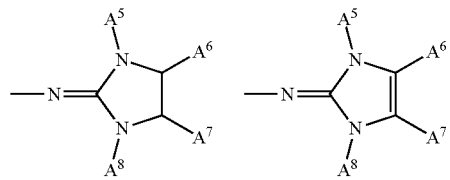

where $A^5$, $A^6$, $A^7$, and $A^8$ are independently hydrogen, an acyclic or a cyclic hydrocarbyl group or an acyclic or a cyclic heteroatom containing hydrocarbyl group, and where any of $A^5$ to $A^8$ may be part of a cyclic hydrocarbyl group or a cyclic heteroatom containing hydrocarbyl group; x is 0, 1, or 2; y is 3, 2, or 1; and x+y=3.

The phosphinimide pre-polymerization catalyst used in an embodiment of the disclosure is defined by the following structure:

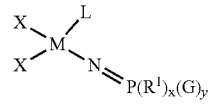

wherein M is Ti, Zr or Hf; P is phosphorus; N is nitrogen; L is a cyclopentadienyl type ligand; each X is independently an activatable ligand; $R^1$ is independently selected from a hydrogen atom; a $C_{1-30}$ hydrocarbyl group which is unsubstituted or substituted with one or more halogen atom; a $C_{1-8}$ alkoxy group; a $C_{6-10}$ aryl group; a $C_{6-10}$ aryloxy group; an amido group of formula $—N(R^A)_2$, wherein the $R^A$ groups are independently selected from a hydrogen atom, a $C_{1-30}$ alkyl group, a $C_{6-10}$ aryl group; a silyl radical of formula $—Si(R^S)_3$, wherein the $R^S$ groups are independently selected from a hydrogen atom, a $C_{1-8}$ alkyl or alkoxy group, a $C_{6-10}$ aryl group, a $C_{6-10}$ aryloxy group; or a germanyl radical of formula $—Ge(R^G)_3$, wherein the $R^G$ groups are independently selected from, a hydrogen atom, a $C_{1-8}$ alkyl or alkoxy radical, a $C_{6-10}$ aryl radical, a $C_{6-10}$ aryloxy radical; G is a guanidinate type group selected from the group comprising:

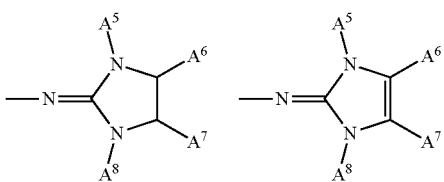

where $A^5$, $A^6$, $A^7$, and $A^8$ are independently hydrogen, an acyclic or a cyclic hydrocarbyl group or an acyclic or a cyclic heteroatom containing hydrocarbyl group, and where any of $A^5$ to $A^8$ may be part of a cyclic hydrocarbyl group or a cyclic heteroatom containing hydrocarbyl group; x is 0, 1, or 2; y is 3, 2, or 1; and x+y=3.

The phosphinimide pre-polymerization catalyst used in an embodiment of the disclosure is defined by the following structure:

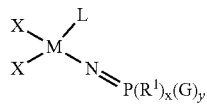

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group selected from the group comprising:

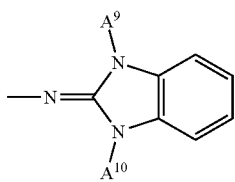

where $A^9$ and $A^{10}$ are independently a hydrogen, an acyclic or a cyclic hydrocarbyl group, or an acyclic or a cyclic heteroatom containing hydrocarbyl group; x is 0, 1, or 2; y is 3, 2, or 1; and x+y=3.

The phosphinimide pre-polymerization catalyst used in an embodiment of the disclosure is defined by the following structure:

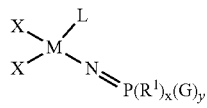

wherein M is Ti, Zr or Hf; P is phosphorus; N is nitrogen; L is a cyclopentadienyl type ligand; each X is independently an activatable ligand; $R^1$ is independently selected from a hydrogen atom; a $C_{1-30}$ hydrocarbyl group which is unsubstituted or substituted with one or more halogen atom; a $C_{1-8}$ alkoxy group; a $C_{6-10}$ aryl group; a $C_{6-10}$ aryloxy group; an amido group of formula $-N(R^4)_2$, wherein the $R^4$ groups are independently selected from a hydrogen atom, a $C_{1-30}$ alkyl group, a $C_{6-10}$ aryl group; a silyl radical of formula $-Si(R^S)_3$, wherein the $R^S$ groups are independently selected from a hydrogen atom, a $C_{1-8}$ alkyl or alkoxy group, a $C_{6-10}$ aryl group, a $C_{6-10}$ aryloxy group; or a germanyl radical of formula $-Ge(R^G)_3$, wherein the $R^G$ groups are independently selected from, a hydrogen atom, a $C_{1-8}$ alkyl or alkoxy radical, a $C_{6-10}$ aryl radical, a $C_{6-10}$ aryloxy radical; G is a guanidinate type group selected from the group comprising:

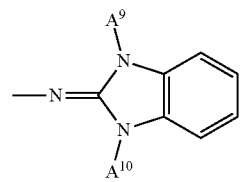

where $A^9$ and $A^{10}$ are independently a hydrogen, an acyclic or a cyclic hydrocarbyl group, or an acyclic or a cyclic heteroatom containing hydrocarbyl group; x is 0, 1, or 2; y is 3, 2, or 1; and x+y=3.

As used herein, the terms "hydrocarbyl", "hydrocarbyl radical" or "hydrocarbyl group" refers to linear or branched, aliphatic, olefinic, acetylenic and aryl (aromatic) radicals comprising hydrogen and carbon that are deficient by one hydrogen. The term "cyclic hydrocarbyl group" connotes hydrocarbyl groups that comprise cyclic moieties and which may have one or more than one cyclic aromatic ring, and/or one or more than one non-aromatic ring. The term "acyclic hydrocarbyl group" connotes hydrocarbyl groups that do not have cyclic moieties such as aromatic or non-aromatic ring structures present within them.

As used herein, the phrase "heteroatom" includes any atom other than carbon and hydrogen that can be bound to carbon. The term "heteroatom containing" or "heteroatom containing hydrocarbyl group" means that one or more than one non carbon atom(s) may be present in the hydrocarbyl groups. Some non-limiting examples of non-carbon atoms that may be present is a heteroatom containing hydrocarbyl group are N, O, S, P and Si as well as halides such as for example Br and metals such as Sn. Some non-limiting examples of heteroatom containing hydrocarbyl groups include for example imines, amine moieties, oxide moieties, phosphine moieties, ethers, ketones, heterocyclics, oxazolines, thioethers, and the like.

In an embodiment of the disclosure, a heteroatom containing hydrocarbyl group is a hydrocarbyl group containing from 1 to 3 atoms selected from the group consisting of boron, aluminum, silicon, germanium, nitrogen, phosphorous, oxygen and sulfur.

The terms "cyclic heteroatom containing hydrocarbyl" or "heterocyclic" refer to ring systems having a carbon backbone that further comprises at least one heteroatom selected from the group consisting of for example boron, aluminum, silicon, germanium, nitrogen, phosphorous, oxygen and sulfur.

In an embodiment of the disclosure, a cyclic heteroatom containing hydrocarbyl group is a cyclic hydrocarbyl group containing from 1 to 3 atoms selected from the group consisting of boron, aluminum, silicon, germanium, nitrogen, phosphorous, oxygen and sulfur.

As used herein, an "alkyl radical" or "alkyl group" includes linear, branched and cyclic paraffin radicals that are deficient by one hydrogen radical; non-limiting examples include methyl ($-CH_3$) and ethyl ($-CH_2CH_3$) radicals. The term "alkenyl radical" or "alkenyl group" refers to linear, branched and cyclic hydrocarbons containing at least one carbon-carbon double bond that is deficient by one hydrogen radical. The term "alkynyl radical" or "alkynyl group" refers to linear, branched and cyclic hydrocarbons containing at least one carbon-carbon triple bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "alkylaryl" group is an alkyl group having an aryl group pendant there from; non-limiting examples include benzyl, phenethyl and tolylmethyl. An "arylalkyl" is an aryl group having one or more alkyl groups pendant there from; non-limiting examples include tolyl, xylyl, mesityl and cumyl.

An "alkoxy" group is an oxy group having an alkyl group pendant there from; and includes for example a methoxy group, an ethoxy group, an iso-propoxy group, and the like.

An "aryloxy" group is an oxy group having an aryl group pendant there from; and includes for example a phenoxy group and the like.

As used herein the term "unsubstituted" means that hydrogen radicals are bounded to the molecular group that is referred to by the term unsubstituted. The term "substituted" means that the group referred to by this term possesses one or more moieties that have replaced one or more hydrogen radicals in any position within the group; non-limiting examples of moieties include halogen radicals (F, Cl, Br), an alkyl group, an alkylaryl group, an arylalkyl group, an alkoxy group, an aryl group, an aryloxy group, an amido group, a silyl group or a germanyl group, hydroxyl groups, carbonyl groups, carboxyl groups, amine groups, phosphine groups, phenyl groups, naphthyl groups, $C_1$ to $C_{10}$ alkyl groups, $C_2$ to $C_{10}$ alkenyl groups, and combinations thereof.

In an embodiment of the disclosure G is a guanidinate type group having the following structure:

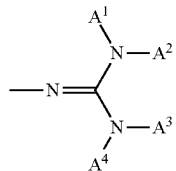

where $A^1$, $A^2$, $A^3$, and $A^4$ are independently hydrogen, an acyclic or a cyclic hydrocarbyl group, or an acyclic or a cyclic heteroatom containing hydrocarbyl group, and where any of $A^1$ to $A^4$ may be part of a cyclic hydrocarbyl group or a cyclic heteroatom containing hydrocarbyl group.

In an embodiment of the disclosure G is a guanidinate type group having the following structure:

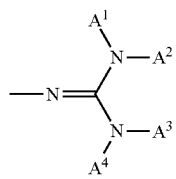

where $A^1$, $A^2$, $A^3$, and $A^4$ are independently a hydrogen, a substituted or unsubstituted acyclic or cyclic hydrocarbyl group, or a substituted or unsubstituted acyclic or cyclic heteroatom containing hydrocarbyl group, and where any of $A^1$ to $A^4$ may be part of a cyclic hydrocarbyl group or a cyclic heteroatom containing hydrocarbyl group.

In an embodiment of the disclosure, $A^1$, $A^2$, $A^3$ and $A^4$ are independently selected from the group comprising a straight chain alkyl group having 1 to 30 carbon atoms, a branched alkyl group having at least 3 carbon atoms, a cyclic alkyl group having at least 3 carbon atoms, an alkylaryl group having at least 7 carbons, or an aryl group having at least 6 carbons.

In an embodiment of the disclosure, $A^1$, $A^2$, $A^3$ and $A^4$ are independently an alkyl group.

In an embodiment of the disclosure, $A^1$, $A^2$, $A^3$ and $A^4$ are independently an alkyl group having 1 to 30 carbon atoms.

In an embodiment of the disclosure, $A^1$, $A^2$, $A^3$ and $A^4$ are independently a straight chain alkyl group having 1 to 30 carbon atoms.

In an embodiment of the disclosure, $A^1$, $A^2$, $A^3$ and $A^4$ are independently a branched alkyl group having at least 3 carbon atoms.

In an embodiment of the disclosure, $A^1$, $A^2$, $A^3$ and $A^4$ are independently a cyclic alkyl group having at least 3 carbon atoms.

In an embodiment of the disclosure, $A^1$, $A^2$, $A^3$ and $A^4$ are independently an aryl group having at least 6 carbon atoms.

In an embodiment of the disclosure G is a guanidinate type group selected from the following structures:

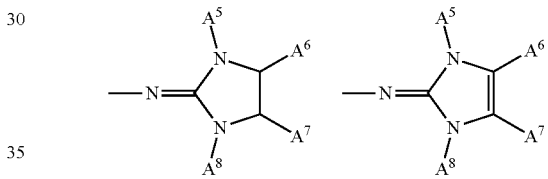

where $A^5$, $A^6$, $A^7$, and $A^8$ are independently a hydrogen, an acyclic or a cyclic hydrocarbyl group, or an acyclic or a cyclic heteroatom containing hydrocarbyl group, and where any of $A^5$, $A^6$, $A^7$, and $A^8$ may be part of a cyclic hydrocarbyl group or a cyclic heteroatom containing hydrocarbyl group.

In an embodiment of the disclosure G is a guanidinate type group selected from the following structures:

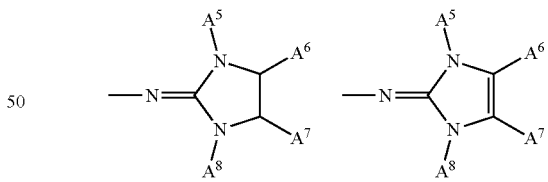

where $A^5$, $A^6$, $A^7$, and $A^8$ are independently a hydrogen, a substituted or unsubstituted acyclic or cyclic hydrocarbyl group, or a substituted or unsubstituted acyclic or a cyclic heteroatom containing hydrocarbyl group, and where any of $A^5$, $A^6$, $A^7$, and $A^8$ may be part of a cyclic hydrocarbyl group or a cyclic heteroatom containing hydrocarbyl group.

In an embodiment of the disclosure, $A^5$, $A^6$, $A^7$, and $A^8$ are independently selected from the group comprising hydrogen, a straight chain alkyl group having 1 to 30 carbon atoms, a branched alkyl group having at least 3 carbon atoms, a cyclic alkyl group having at least 3 carbon atoms, an alkylaryl group having at least 7 carbons, or an aryl group having at least 6 carbons.

In an embodiment of the disclosure, $A^5$ and $A^8$ are independently an alkyl group.

In an embodiment of the disclosure, $A^5$ and $A^8$ are independently an alkyl group having 1 to 30 carbon atoms.

In an embodiment of the disclosure, $A^5$ and $A^8$ are independently a straight chain alkyl group having 1 to 30 carbon atoms.

In an embodiment of the disclosure, $A^5$ and $A^8$ are independently a branched alkyl group having at least 3 carbon atoms.

In an embodiment of the disclosure, $A^5$ and $A^8$ are a are independently a cyclic alkyl group having at least 3 carbon atoms.

In an embodiment of the disclosure, $A^5$ and $A^8$ are independently an aryl group having at least 6 carbon atoms.

In an embodiment of the disclosure, $A^5$ and $A^8$ are hydrogen.

In an embodiment of the disclosure, $A^6$ and $A^7$ are independently an alkyl group.

In an embodiment of the disclosure, $A^6$ and $A^7$ are independently an alkyl group having 1 to 30 carbon atoms.

In an embodiment of the disclosure, $A^6$ and $A^7$ are a straight chain alkyl group having 1 to 30 carbon atoms.

In an embodiment of the disclosure, $A^6$ and $A^7$ are a branched alkyl group having at least 3 carbon atoms.

In an embodiment of the disclosure, $A^6$ and $A^7$ are independently an aryl group having at least 6 carbon atoms.

In an embodiment of the disclosure, $A^6$ and $A^7$ are part of a cyclic hydrocarbyl group.

In an embodiment of the disclosure, $A^6$ and $A^7$ are hydrogen.

In an embodiment of the disclosure, G is a guanidinate type group having the following structure:

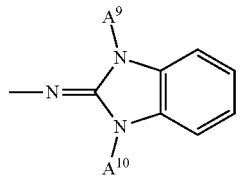

where $A^9$ and $A^{10}$ are independently a hydrogen, an acyclic or a cyclic hydrocarbyl group, or an acyclic or a cyclic heteroatom containing hydrocarbyl group.

In an embodiment of the disclosure, G is a guanidinate type group having the following structure:

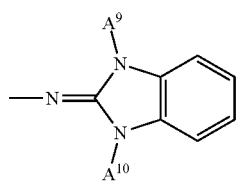

where $A^9$ and $A^{10}$ are independently a hydrogen, a substituted or unsubstituted acyclic or cyclic hydrocarbyl group, or a substituted or unsubstituted acyclic or a cyclic heteroatom containing hydrocarbyl group.

In an embodiment of the disclosure, $A^9$ and $A^{10}$ are independently selected from the group comprising hydrogen, a straight chain alkyl group having 1 to 30 carbon atoms, a branched alkyl group having at least 3 carbon atoms, a cyclic alkyl group having at least 3 carbon atoms, an alkylaryl group having at least 7 carbons, or an aryl group having at least 6 carbons.

In an embodiment of the disclosure, $A^9$ and $A^{10}$ are independently an alkyl group.

In an embodiment of the disclosure, $A^9$ and $A^{10}$ are independently an alkyl group having 1 to 30 carbon atoms.

In an embodiment of the disclosure, $A^9$ and $A^{10}$ are independently a straight chain alkyl group having 1 to 30 carbon atoms.

In an embodiment of the disclosure, $A^9$ and $A^{10}$ are independently a branched alkyl group having at least 3 carbon atoms.

In an embodiment of the disclosure, $A^9$ and $A^{10}$ are isopropyl groups.

In an embodiment of the disclosure, $A^9$ and $A^{10}$ are tert-butyl groups.

In an embodiment of the disclosure, $A^9$ and $A^{10}$ are a are independently a cyclic alkyl group having at least 3 carbon atoms.

In an embodiment of the disclosure, $A^9$ and $A^{10}$ are independently an aryl group having at least 6 carbon atoms.

In an embodiment of the disclosure, $A^9$ and $A^{10}$ are hydrogen.

In an embodiment of the disclosure, M is titanium, Ti.

In an embodiment of the disclosure, $R^1$ is a hydrocarbyl group which is unsubstituted or substituted with one or more halogen atom.

In an embodiment of the disclosure, $R^1$ is an alkyl group.

In an embodiment of the disclosure, $R^1$ is an alkyl group having 1 to 30 carbon atoms.

In an embodiment of the disclosure, $R^1$ is an aryl group.

In an embodiment of the disclosure, $R^1$ is an isopropyl group.

In an embodiment of the disclosure, $R^1$ is a tert-butyl group.

In an embodiment of the disclosure, $R^1$ is a phenyl group.

In an embodiment of the disclosure, $R^1$ is a hydrogen atom.

In an embodiment of the disclosure, x is 2 and y is 1.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be selected from the group consisting of a $C_{1-30}$ hydrocarbyl radical (which hydrocarbyl radical may be unsubstituted or further substituted by for example a halide and/or a hydrocarbyl group; for example a suitable substituted $C_{1-30}$ hydrocarbyl radical is a pentafluorobenzyl group such as $—CH_2C_6F_5$); a halogen atom; a $C_{1-8}$ alkoxy radical; a $C_{6-10}$ aryl or aryloxy radical (each of which may be further substituted by for example a halide and/or a hydrocarbyl group); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula $—Si(R')_3$ wherein each R' is independently selected from the group consisting of hydrogen, a $C_{1-8}$ alkyl or alkoxy radical, $C_{6-10}$ aryl or aryloxy radicals; and a germanyl radical of the formula —Ge(R')$_3$ wherein R' is as defined directly above.

In an embodiment of the disclosure, L is a ligand selected from the group consisting of cyclopentadienyl, substituted cyclopentadienyl, indenyl, substituted indenyl, fluorenyl, and substituted fluorenyl.

In an embodiment of the disclosure, L is an unsubstituted cyclopentadienyl ligand (i.e. Cp).

In the current disclosure, the term "activatable", means that the ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present disclosure, the activatable ligand, X is independently selected from the group consisting of a hydrogen atom; a halogen atom, a $C_{1-10}$ hydrocarbyl radical; a $C_{1-10}$ alkoxy radical; and a $C_{6-10}$ aryl or aryloxy radical, where each of the hydrocarbyl, alkoxy, aryl, or aryl oxide radicals may be un-substituted or further substituted by one or more halogen or other group; a $C_{1-8}$ alkyl; a $C_{1-8}$ alkoxy, a $C_{6-10}$ aryl or aryloxy; an amido or a phosphido radical, but where X is not a cyclopentadienyl. Two X ligands may also be joined to one another and form for example, a substituted or unsubstituted diene ligand (i.e. 1,3-butadiene); or a delocalized heteroatom containing group such as an acetate or acetamidinate group. In a convenient embodiment of the disclosure, each X is independently selected from the group consisting of a halide atom, a $C_{1-4}$ alkyl radical and a benzyl radical.

In an embodiment, particularly suitable activatable ligands are monoanionic such as a halide (e.g. chloride) or a hydrocarbyl (e.g. methyl, benzyl).

The catalyst activator (or simply the "activator" for short) used to activate the phosphinimide catalyst can be any suitable activator including one or more activators selected from the group consisting of alkylaluminoxanes and ionic activators, optionally together with an alkylating agent.

Without wishing to be bound by theory, alkylaluminoxanes are thought to be complex aluminum compounds of the formula: $R^3{}_2Al^1O(R^3Al^1O)_mAl^1R^3{}_2$, wherein each $R^3$ is independently selected from the group consisting of $C_{1-20}$ hydrocarbyl radicals and m is from 3 to 50. Optionally a hindered phenol can be added to the alkylaluminoxane to provide a molar ratio of Al$^1$:hindered phenol of from 2:1 to 5:1 when the hindered phenol is present.

In an embodiment of the disclosure, $R^3$ of the alkylaluminoxane, is a methyl radical and m is from 10 to 40.

The alkylaluminoxanes are typically used in substantial molar excess compared to the amount of group 4 transition metal in the phosphinimide compound/complex. The Al$^1$:group 4 transition metal molar ratios may be from about 10:1 to about 10,000:1, preferably from about 30:1 to about 500:1.

In an embodiment of the disclosure, the catalyst activator comprises methylaluminoxane (MAO).

In an embodiment of the disclosure, the catalyst activator comprises modified methylaluminoxane (MMAO).

It is well known in the art, that the alkylaluminoxane can serve dual roles as both an alkylator and an activator. Hence, an alkylaluminoxane activator is often used in combination with activatable ligands such as halogens.

Alternatively, the catalyst activator of the present disclosure may be a combination of an alkylating agent (which may also serve as a scavenger) with an activator capable of ionizing the group 4 of the transition metal catalyst (i.e. an ionic activator). In this context, the activator can be chosen from one or more alkylaluminoxane and/or an ionic activator, since an alkylaluminoxane may serve as both an activator and an alkylating agent.

When present, the alkylating agent may be selected from the group consisting of $(R^4)_p MgX^2{}_{2-p}$ wherein $X^2$ is a halide and each $R^4$ is independently selected from the group consisting of $C_{1-10}$ alkyl radicals and p is 1 or 2; $R^4Li$ wherein in $R^4$ is as defined above, $(R^4)_q ZnX^2{}_{2-q}$ wherein $R^4$ is as defined above, $X^2$ is halogen and q is 1 or 2; and $(R^4)_s Al^2X^2{}_{3-s}$ wherein $R^4$ is as defined above, $X^2$ is halogen and s is an integer from 1 to 3. Preferably in the above compounds $R^4$ is a $C_{1-4}$ alkyl radical, and $X^2$ is chlorine. Commercially available compounds include triethyl aluminum (TEAL), trimethylaluminum, triisobutyl aluminum, tributyl aluminum, diethyl aluminum chloride (DEAC), dibutyl magnesium ((Bu)$_2$Mg), and butyl ethyl magnesium (BuEtMg or BuMgEt). Alkylaluminoxanes can also be used as alkylating agents.

The ionic activator may be selected from the group consisting of: (i) compounds of the formula $[R^5]^+[B(R^6)_4]^-$ wherein B is a boron atom, $R^5$ is a cyclic $C_{5-7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—(R$^7$)$_3$; wherein each $R^7$ is independently selected from the group consisting of a hydrogen atom and a $C_{1-4}$ alkyl radical; and (ii) compounds of the formula $[(R^8)_t ZH]^+[B(R^6)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^6$ is as defined above; and (iii) compounds of the formula B(R$^6$) 3 wherein $R^6$ is as defined above.

In the above compounds preferably $R^6$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

Examples of compounds capable of ionizing the phosphinimide catalyst include the following compounds: triethylammonium tetra(phenyl)boron, tripropylammonium tetra (phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra (phenyl)boron, triphenylphosphonium tetra)phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltris-pentafluorophenyl borate, triphenylmethylium phenyl-trispentafluorophenyl borate, benzene (diazonium) phenyltrispentafluorophenyl borate, tropillium tetrakis (2,3,5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4,5-trifluorophenyl) borate, benzene (diazonium) tetrakis (3,4,5-trifluorophenyl) borate, tropillium tetrakis (1,2,2-trifluoroethenyl) borate, trophenylmethylium tetrakis (1,2,2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3,4,5-tetrafluorophenyl) borate, and benzene (diazonium) tetrakis (2,3,4,5-tetrafluorophenyl) borate.

Commercially available activators which are capable of ionizing the phosphinimide catalyst include: N,N-dimethylaniliniumtetrakispentafluorophenyl borate ("[Me$_2$NHPh][B (C$_6$F$_5$)$_4$]"); triphenylmethylium tetrakispentafluorophenyl borate ("[Ph$_3$C][B(C$_6$F$_5$) 4]"); and trispentafluorophenyl boron.

In an embodiment of the disclosure, the ionic activator compounds may be used in amounts which provide a molar ratio of group 4 transition metal to boron that will be from 1:1 to 1:6.

Optionally, mixtures of alkylaluminoxanes and ionic activators can be used as activators for the phosphinimide pre-polymerization catalyst.

The phosphinimide pre-polymerization catalysts of the present disclosure may be used in any conventional olefin polymerization process, such as gas phase polymerization, slurry phase polymerization or solution phase polymerization. The use of a "heterogeneized" catalyst system is preferred for use in gas phase and slurry phase polymerization while a homogeneous catalyst is preferred for us in a solution phase polymerization. A heterogenized catalyst system may be formed by supporting a pre-polymerization catalyst, optionally along with an activator on a support, such as for example, a silica support, as is well known to persons skilled in the art.

Solution polymerization processes for the polymerization or copolymerization of ethylene are well known in the art (see for example U.S. Pat. Nos. 6,372,864 and 6,777,509). These processes are conducted in the presence of an inert hydrocarbon solvent, typically, a C$_{5-12}$ hydrocarbon which may be unsubstituted or substituted by C$_{1-4}$ alkyl group such as pentane, methyl pentane, hexane, heptane, octane, cyclohexane, methylcyclohexane and hydrogenated naphtha. An example of a suitable solvent which is commercially available is "Isopar E" (C$_{8-12}$ aliphatic solvent, Exxon Chemical Co.).

The polymerization temperature in a conventional solution process is from about 80° C. to about 300° C. In an embodiment of the disclosure the polymerization temperature in a solution process is from about 120° C. to about 250° C. The polymerization pressure in a solution process may be a "medium pressure process", meaning that the pressure in the reactor is less than about 6,000 psi (about 42,000 kiloPascals or kPa). In an embodiment of the disclosure, the polymerization pressure in a solution process may be from about 10,000 to about 40,000 kPa, or from about 14,000 to about 22,000 kPa (i.e. from about 2,000 psi to about 3,000 psi).

Suitable monomers for copolymerization with ethylene include C$_{3-20}$ mono- and di-olefins. Preferred comonomers include C$_{3-12}$ alpha olefins which are unsubstituted or substituted by up to two C$_{1-6}$ alkyl radicals, C$_{8-12}$ vinyl aromatic monomers which are unsubstituted or substituted by up to two substituents selected from the group consisting of C$_{1-4}$ alkyl radicals, C$_{4-12}$ straight chained or cyclic diolefins which are unsubstituted or substituted by a C$_{1-4}$ alkyl radical.

Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

The polyethylene polymers which may be prepared in accordance with the present disclosure are LLDPE's which typically comprise not less than 60, preferably not less than 75 weight % of ethylene and the balance one or more C$_{4-10}$ alpha olefins, preferably selected from the group consisting of 1-butene, 1-hexene and 1-octene. The polyethylene prepared in accordance with the present disclosure may be LLDPE having a density from about 0.910 to 0.935 g/cm$^3$ or (linear) high density polyethylene having a density above 0.935 g/cm$^3$. The present disclosure might also be useful to prepare polyethylene having a density below 0.910 g/cm$^3$—the so-called very low and ultra-low density polyethylenes.

Generally, the alpha olefin may be present in an amount from about 3 to 30 weight %, preferably from about 4 to 25 weight %.

The present disclosure may also be used to prepare co- and ter-polymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

In solution polymerization, the monomers are dissolved/dispersed in the solvent either prior to being fed to the reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the reactor.

Generally, the catalyst components (the phosphinimide pre-polymerization catalyst, an ionic activator and optionally an alkylaluminoxane) may be premixed in the solvent for the reaction or fed as separate streams to the reactor. In some instances premixing it may be desirable to provide a reaction time for the catalyst components prior to entering the reaction. Such an "in line mixing" technique is described in a number of patents in the name of DuPont Canada Inc. (e.g. U.S. Pat. No. 5,589,555 issued Dec. 31, 1996).

An embodiment of the disclosure is a polymerization process comprising polymerizing ethylene optionally with one or more $C_{3-12}$ alpha olefins in the presence of a polymerization catalyst system comprising:
i) a phosphinimide pre-polymerization catalyst having the following structure:

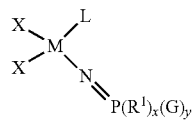

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group; x is 0, 1, or 2; y is 3, 2, or 1; and x+y=3; and ii) a catalyst activator.

An embodiment of the disclosure is a polymerization process comprising polymerizing ethylene optionally with one or more $C_{3-12}$ alpha olefins in the presence of a polymerization catalyst system comprising:
i) a phosphinimide pre-polymerization catalyst having the following structure:

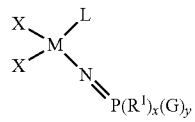

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group having the following structure:

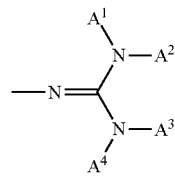

where $A^1$, $A^2$, $A^3$, and $A^4$ are independently hydrogen, an acyclic or a cyclic hydrocarbyl group, or an acyclic or a cyclic heteroatom containing hydrocarbyl group, and where any of $A^1$ to $A^4$ may be part of a cyclic hydrocarbyl group or a cyclic heteroatom containing hydrocarbyl group; x is 0, 1, 2 or 3; y is 3, 2, 1, or 0; and x+y=3; and ii) a catalyst activator.

An embodiment of the disclosure is a polymerization process comprising polymerizing ethylene optionally with one or more $C_{3-12}$ alpha olefins in the presence of a polymerization catalyst system comprising:
i) a phosphinimide pre-polymerization catalyst having the following structure:

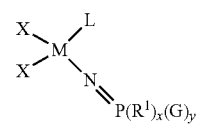

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group selected from the group comprising:

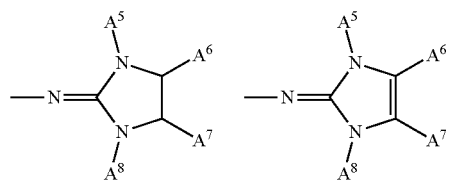

where $A^5$, $A^6$, $A^7$, and $A^8$ are independently hydrogen, an acyclic or a cyclic hydrocarbyl group or an acyclic or a cyclic heteroatom containing hydrocarbyl group, and where any of $A^5$ to $A^8$ may be part of a cyclic hydrocarbyl group or a cyclic heteroatom containing hydrocarbyl group; x is 0, 1, or 2; y is 3, 2, or 1; and x+y=3; and ii) a catalyst activator.

An embodiment of the disclosure is a polymerization process comprising polymerizing ethylene optionally with one or more $C_{3-12}$ alpha olefins in the presence of a polymerization catalyst system comprising:
i) a phosphinimide pre-polymerization catalyst having the following structure:

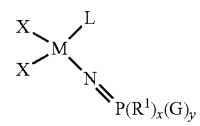

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group selected from the group comprising:

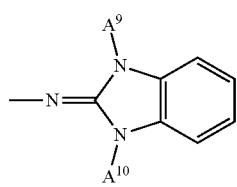

where $A^9$ and $A^{10}$ are independently a hydrogen, an acyclic or a cyclic hydrocarbyl group, or an acyclic or a cyclic heteroatom containing hydrocarbyl group; x is 0, 1, or 2; y is 3, 2, or 1; and x+y=3; and ii) a catalyst activator.

In an embodiment of the disclosure, the polymerization process is a solution phase polymerization process carried out in a solvent.

In an embodiment of the disclosure, the polymerization process comprises polymerizing ethylene with one or more $C_{3-12}$ alpha olefins.

In an embodiment of the disclosure, the polymerization process comprises polymerizing ethylene with 1-octene.

EXAMPLES

General Experimental Methods

All reactions were conducted under nitrogen using standard Schlenk techniques or in an inert atmosphere glovebox. Reaction solvents were purified using the system described by Grubbs et al. (see: Pangborn, A. B.; Giardello, M. A.; Grubbs, R. H.; Rosen R. K.; Timmers, F. J. *Organometallics* 1996, 15, 1518-1520) and then stored over activated molecular sieves in an inert atmosphere glovebox. Di-tert-butylchlorophosphine, copper(I) bromide dimethyl sulfide complex, trimethylsilyl azide, $CpTiCl_3$ (note: "Cp"=cyclopentadienyl); and NaOMe were purchased from Aldrich and used as it is. 13× molecular sieves were purchased from Grace and activated at 260° C. overnight. LiBr was dried at 150° C. overnight under vacuum. 2,6-di-tert-butyl-4-ethylphenol (BHEB), and azidotrimethylsilane were purchased from Aldrich and used as received. MMAO-7 (7 wt % solution in Isopar-E) was purchase from Akzo Nobel and used as received.

Triphenylcarbenium tetrakis(pentafluorophenyl)borate was purchased from Albemarle Corp. and used as received. Deuterated NMR solvents, toluene-$d_8$ and dichloromethane-$d_2$, were purchased from Aldrich and stored over 13× molecular sieves prior to use. NMR spectra were recorded on a Bruker 400 MHz spectrometer ($^1$H: 400.1 MHz, $^{31}$P: 162 MHz).

Molecular weight information (Mw, Mn and Mz in g/mol) and molecular weight distribution (Mw/Mn), and z-average molecular weight distribution ($M_z/M_w$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with CIRRUS® GPC software. The columns were calibrated with narrow distribution polystyrene standards. The polystyrene molecular weights were converted to polyethylene molecular weights using the Mark-Houwink equation, as described in the ASTM standard test method D6474.

The branch frequency of copolymer samples (i.e. the short chain branching, SCB per 1000 backbone carbon atoms) and the $C_8$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC® version 7.2a software was used for the measurements.

The determination of branch frequency as a function of molecular weight (and hence the comonomer distribution) was carried out using high temperature Gel Permeation Chromatography (GPC) and FT-IR of the eluent. Polyethylene standards with a known branch content, polystyrene and hydrocarbons with a known molecular weight were used for calibration.

Example 1

The general synthetic steps and methods employed to make the phosphinimide pre-catalyst of Example 1, (cyclopentadienyl)(1,3-diisopropylbenzimidazolin-2-ylidenamino-(di-tert-butyl)phosphinimide)titanium dichloride are provided below.

Synthesis of 1,3-Dihydro-1,3-bisisopropyl-2H-benzimidazol-2-ylidene

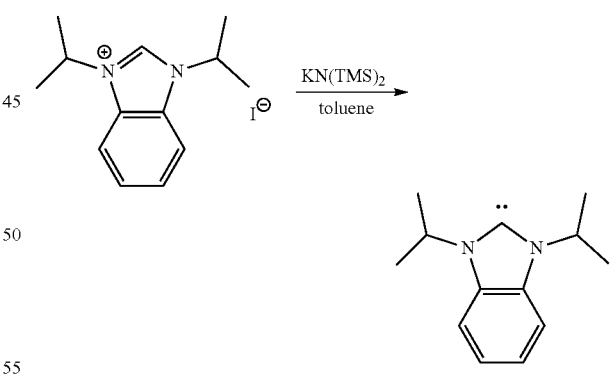

1,3-Diisopropyl-1H-benzo[d]imidazole-3-ium iodide (4.50 g, 13.63 mmol) was suspended in toluene (200 mL). $KN(TMS)_2$ (2.72 g, 13.63 mmol) in toluene (50 mL) was added dropwise at room temperature. The mixture was stirred overnight and all volatiles were removed under vacuum. The residue was extracted with pentane (3×50 mL) and filtered through a pad of Celite. After the solution were concentrated into ca. 10 mL, the flask was placed in the freezer at −35° C. to precipitate out the product. Yield: 2.3 g, 83%. $^1$H NMR (toluene-d8): δ 7.04 (s, 4H), 4.40 (sep, 2H), 1.51 (d, 12H).

Synthesis of 1,3-diisopropyl-N-(trimethylsilyl)-1,3-dihydro-2H-benzo[d]imidazole-2-imine

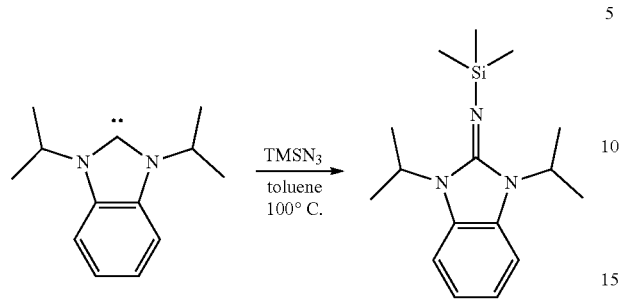

Neat 1,3-dihydro-1,3-bisisopropyl-2H-benzimidazol-2-ylidene (0.76 g, 3.76 mmol) was loaded in a flask. trimethylsilyl azide (1.3 g, 1.5 mL, 11.3 mmol) was added. The mixture was stirred at room temperature for one hour, and then heated at 100° C. for 3 hours. All volatiles were removed under reduced vacuum to obtain the pure product after the flask was cooled down to room temperature. Yield: 0.7 g, 64%. $^1$H NMR (CD$_2$Cl$_2$): δ 7.06 (m, 2H), 6.90 (m, 2H), 4.71 (sep, 2H), 1.43 (d, 12H), 0.15 (s, 9H).

Synthesis of 1,3-diisopropyl-1,3-dihydro-2H-benzo[d]imidazol-2-imine

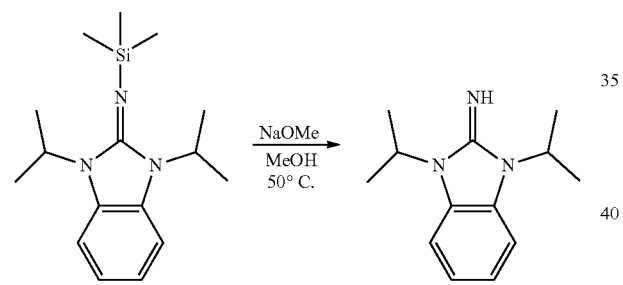

The mixture of 1,3-diisopropyl-N-(trimethylsilyl)-1,3-dihydro-2H-benzo[d]imidazole-2-imine (3.5 g, 12.09 mmol), NaOMe (0.5 g, 9.26 mmol) and MeOH (60 mL) was heated at 50° C. overnight. After all volatiles were removed under vacuum, the solid was extracted with heptane (3×50 mL) and filtered through a pad of Celite. The product as a white powder was obtained after all heptane was removed. Yield: 2.5 g, 95%. $^1$H NMR (CD$_2$Cl$_2$): δ 7.00 (m, 2H), 6.88 (m, 2H), 4.63 (s, 2H), 1.48 (d, 12H).

Synthesis of 1,3-diisopropylbenzimidazolin-2-ylidenamino-(di-tert-butyl)phosphine

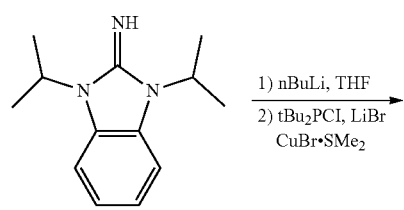

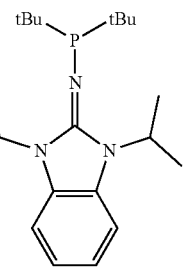

nBuLi (13.87 mL, 22.19 mmol, 1.6 M in hexane) was added into the solution of 1,3-diisopropyl-1,3-dihydro-2H-benzo[d]imidazol-2-imine (4.82 g, 22.18 mmol) in THF (100 mL). After the solution was stirred for 2 hours at room temperature, CuBr—SMe$_2$ (0.5 g, 2.43 mmol), LiBr (1 g, 11.51 mmol) and tBu$_2$PCl (4 g, 22.14 mmol) was added. The mixture was heated at 60° C. for 2 days. All volatiles were removed under vacuum, and the residue was extracted with toluene (2×50 mL). After being filtered through a pad of Celite, the solution was dried under vacuum. The product as a white solid was purified through recrystallization from hot heptane. Yield: 3.5 g, 44%. $^{31}$P{H} (toluene-d8): δ 71.5. $^1$H NMR (toluene-d8): δ 6.84 (s, 4H), 2.07 (m, 2H), 1.25 (t, 12H), 1.23 (s, 18H).

Synthesis of 1,3-diisopropylbenzimidazolin-2-ylidenamino-(di-tert-butyl)-(N-trimethylsilyl)phosphinimine

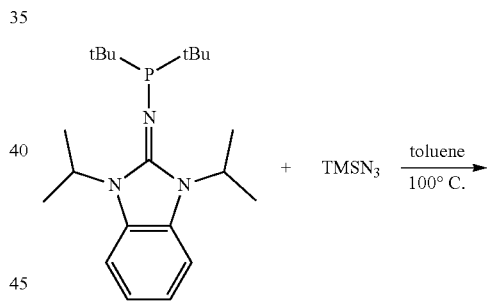

Trimethylsilyl azide (2.6 g, 22.6 mmol, 3 mL) was added into a solution of 1,3-diisopropylbenzimidazolin-2-ylidenamino-(di-tert-butyl)phosphine (1.88 g, mmol) in toluene (5 mL). The mixture was stirred at room temperature for 3 hours, and then heated at 100° C. overnight. The product was obtained after all volatiles were removed under vacuum. Yield: 2.26 g, 97%. $^{31}$P{H} (toluene-d8): δ 16.1. $^1$H NMR (toluene-d8): δ 6.94 (m, 4H), 2.13 (m, 2H), 1.34 (d, 18H), 1.30 (d, 12H), 0.44 (s, 9H).

Synthesis of (cyclopentadienyl)(1,3-diisopropylbenzimidazolin-2-ylidenamino-(di-tert-butyl)phosphinimide)titanium dichloride

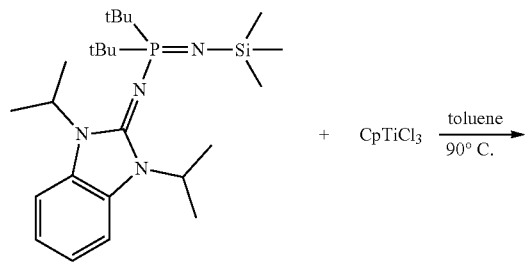

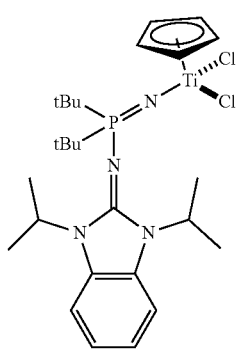

Cyclopentadienyl titanium(IV) trichloride (1.10 g, 5 mmol), and 1,3-diisopropylbenzimidazolin-2-ylidenamino-(di-tert-butyl)-(N-trimethylsilyl)phosphinimine (2.25 g, 5 mmol) were mixed in toluene (60 mL). The mixture was heated at 90° C. overnight. After all volatiles were removed under vacuum, a yellow solid was recrystallized in hot toluene (10 mL) overnight to obtain the desirable product. Yield: 2.59 g, 93%. $^{31}$P{H} (toluene-d8): δ 14.65. $^{1}$H NMR (toluene-d8, δ): 6.98 (m, 2H), 6.90-6.98 (m, 2H), 5.31 (s, 2H), 1.35 (s, 12H), 1.31 (d, 18H).

Synthesis of (cyclopentadienyl)(1,3-diisopropylbenzimidazolin-2-ylidenamino-(di-tert-butyl)phosphinimide)dimethyltitanium

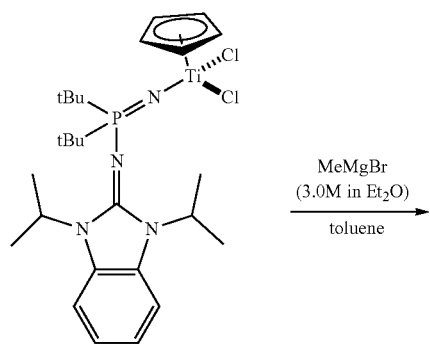

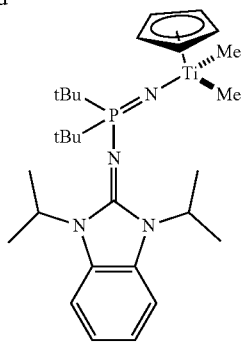

(cyclopentadienyl)(1,3-diisopropylbenzimidazolin-2-ylidenamino-(di-tert-butyl)phosphinimide)titanium dichloride (2.590 g, 4.63 mmol) was dissolved in toluene (20 mL). Methylmagnesium bromide (3.0 M in diethyl ether, 4.7 mL, 13.9 mmol) was added dropwise at room temperature. The mixture was stirred overnight. All volatiles were removed under vacuum. The resulting light grey solid was extracted with toluene (20 mL), filtered to remove a black solid, and the extracts evaporated under reduced pressure to yield a yellow solid. The solids were once again extracted with toluene (20 mL), filtered and evaporated to yield the product as a yellow solid. Yield: 1.75 g, 73%. $^{1}$H NMR (toluene-d8): δ 6.92 (m, 4H), 6.22 (s, 5H), 5.70 (br, 2H), 1.40 (d, 18H), 1.23 (d, 12H), 0.57 (s, 6H). $^{31}$P{$^{1}$H}NMR (toluene-d8) δ 8.7 (s).

Solution Polymerization

Continuous solution polymerizations were conducted on a continuous polymerization unit (CPU) using cyclohexane as the solvent. The CPU contained a 71.5 mL stirred reactor and was operated at a temperature of 140° C. for the polymerization experiments. An upstream mixing reactor having a 20 mL volume was operated at 5° C. lower than the polymerization reactor. The mixing reactor was used to pre-heat the ethylene, 1-octene and some of the solvent streams. Catalyst feeds (xylene or cyclohexane solutions of titanium phosphinimide complex and (Ph$_3$C)[B(C$_6$F$_5$)$_4$] as a catalyst activator) and additional solvent were added directly to the polymerization reactor in a continuous process. A total continuous flow of 27 mL/min into the polymerization reactor was maintained.

Copolymers were made at a 1-octene/ethylene weight ratio of 0.15, 0.3, or 0.5. The ethylene was fed at a 10 wt % ethylene concentration in the polymerization reactor. The CPU system operated at a pressure of 10.5 MPa. The solvent, monomer, and comonomer streams were all purified by the CPU systems before entering the reactor. The polymerization activity, $k_p$ (expressed in mM$^{-1}$·min$^{-1}$), is defined as:

$$k_p = \left(\frac{Q}{100-Q}\right)\left(\frac{1}{[Ti]}\right)\left(\frac{1}{HUT}\right)$$

where Q is ethylene conversion (%) (measured using an online gas chromatograph (GC)), [Ti] is catalyst concentration in the reactor (mM), and HUT is hold-up time in the reactor (2.6 min).

Copolymer samples were collected at 90±1% ethylene conversion (Q), dried in a vacuum oven, ground, and then analyzed using FTIR (for short-chain branch frequency) and GPC-RI (for molecular weight and distribution). Polymerization conditions are listed in Table 1 and copolymer properties are listed in Table 2.

Inventive copolymerzations of ethylene with 1-octene with the catalyst of Example No 1 were carried out in polymerization Run Nos 1-3 under increasing ratios of comonomer.

Comparative copolymerizations of ethylene with 1-octene using the catalyst (cyclopentadienyl)((t-Bu)$_3$PN)TiCl$_2$, Example 2, comparative, were carried out in polymerization Run Nos 4, 5 and 6 under increasing ratios of comonomer. Catalyst feeds (xylene solutions of (cyclopentadienyl)((t-Bu)$_3$PN)TiCl$_2$, (Ph$_3$C)[B(C$_6$F$_5$)$_4$] and MMAO-7/BHEB) and additional solvent were added directly to the polymerization reactor in a continuous process. MMAO-7 and BHEB solution flows were combined prior to the reactor to ensure that all of the phenolic OH had been passivated through reaction with MMAO-7 prior to reaching the reactor.

A person skilled in the art will see from the data provided in Tables 1 and 2, that under similar copolymerization conditions, the catalyst of Inventive Example 1, provides similar higher molecular ethylene copolymers as the comparative catalyst system, while also incorporating a similar amount of comonomer (i.e. 1-octene) as indicated by the amount of short chain branching per thousand backbone carbon atoms. The new phosphinimide catalyst of Inventive Example 1, then, provides ethylene 1-octene copolymers with good comonomer incorporation and good molecular weight, when used in a solution phase polymerization process.

INDUSTRIAL APPLICABILITY

Group 4 transition metal catalysts may be used to facilitate the polymerization of ethylene and alpha olefins into commercially useful thermoplastic materials. The present

TABLE 1

Ethylene/1-Octene Copolymerization Conditions

| | Polymerization Run. No. | | | | | |
|---|---|---|---|---|---|---|
| | 1 | 2 | 3 | 4 | 5 | 6 |
| Catalyst Example No. | 1 | 1 | 1 | 2, comp | 2, comp | 2, comp |
| [Metal] (μM) | 22.96 | 22.96 | 22.96 | 0.18 | 0.20 | 0.25 |
| B (from Borate)/Ti | 27.56 | 27.56 | 27.56 | 0.21 | 0.24 | 0.30 |
| Al (from MMAO-7)/Ti | 0 | 0 | 0 | 14.07 | 16.30 | 20.00 |
| BHEB /Al | 0 | 0 | 0 | 4.22 | 4.89 | 6.00 |
| Reactor Temp. (° C.) | 140 | 140 | 140 | 140 | 140 | 140 |
| C2 Flow (g/min) | 2.1 | 2.1 | 2.1 | 2.1 | 2.1 | 2.1 |
| C8/C2 | 0.15 | 0.30 | 0.50 | 0.15 | 0.30 | 0.50 |
| C2 Conversion, Q (%) | 90.75 | 90.54 | 89.63 | 89.52 | 89.85 | 90.70 |
| $k_p$ (mM$^{-1}$ · min$^{-1}$) | 164 | 160 | 145 | 18675 | 16714 | 15004 |

Note:

C2 = ethylene;

C8 = 1-octene

TABLE 2

Copolymer Properties

| | Polymerization Run No. | | | | | |
|---|---|---|---|---|---|---|
| | 1 | 2 | 3 | 4 | 5 | 6 |
| Catalyst Example No. | 1 | 1 | 1 | 2, Comp. | 2, Comp. | 2, Comp. |
| FTIR 1-octene content (weight percent, wt %) | 2.8 | 5.2 | 7.9 | 2.3 | 4.2 | 6.2 |
| FTIR Short Chain Branching per 1000 carbon atoms (SCB/1000 C's) | 3.6 | 6.8 | 10.5 | 2.9 | 5.4 | 8.2 |
| Mw | 184437 | 144169 | 119133 | 193020 | 143022 | 166897 |
| Mn | 92510 | 79923 | 63837 | 116080 | 101897 | 90071 |
| Mw/Mn | 1.99 | 1.8 | 1.87 | 1.66 | 1.64 | 1.59 | disclosure provides a new group 4 transition metal polymerization catalyst which polymerizes ethylene with an alpha-olefin to produce ethylene copolymers having high molecular weight.

The invention claimed is:
1. A phosphinimide pre-polymerization catalyst having the following structure:

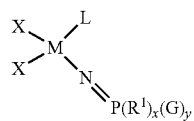

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group having the following structure:

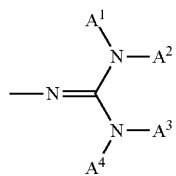

where $A^1$, $A^2$, $A^3$, and $A^4$ are independently hydrogen, an acyclic or a cyclic hydrocarbyl group, or an acyclic or a cyclic heteroatom containing hydrocarbyl group, and where any of $A^1$ to $A^4$ may be part of a cyclic hydrocarbyl group or a cyclic heteroatom containing hydrocarbyl group; x is 0, 1, or 2; y is 3, 2, or 1; and x+y=3.

2. The phosphinimide pre-polymerization catalyst of claim 1, wherein the L is a cyclopentadienyl ligand.

3. The phosphinimide pre-polymerization catalyst of claim 2, wherein $R^1$ is independently a hydrocarbyl group which is unsubstituted or substituted with one or more halogen atom.

4. The phosphinimide pre-polymerization catalyst of claim 3, wherein each $R^1$ is a tert-butyl group.

5. The phosphinimide pre-polymerization catalyst of claim 1, wherein M is Ti.

6. The phosphinimide pre-polymerization catalyst of claim 1, wherein G is a guanidinate type group selected from the following structures:

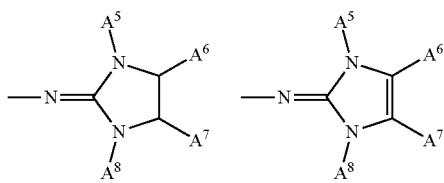

where $A^5$, $A^6$, $A^7$, and $A^8$ are independently a hydrogen, an acyclic or cyclic hydrocarbyl group, or an acyclic or a cyclic heteroatom containing hydrocarbyl group, and where any of $A^5$, $A^6$, $A^7$, and $A^8$ may be part of a cyclic hydrocarbyl group or a cyclic heteroatom containing hydrocarbyl group.

7. The phosphinimide pre-polymerization catalyst of claim 6, wherein $A^5$ and $A^8$ are alkyl groups.

8. The phosphinimide pre-polymerization catalyst of claim 7, wherein $A^6$ and $A^7$ are part of a cyclic hydrocarbyl group.

9. The phosphinimide pre-polymerization catalyst of claim 8, wherein the L is a cyclopentadienyl ligand.

10. The phosphinimide pre-polymerization catalyst of claim 9, wherein $R^1$ is independently a hydrocarbyl group which is unsubstituted or substituted with one or more halogen atom.

11. The phosphinimide pre-polymerization catalyst of claim 10, wherein each $R^1$ is a tert-butyl group.

12. The phosphinimide pre-polymerization catalyst of claim 6, wherein M is Ti.

13. The phosphinimide pre-polymerization catalyst of claim 1, wherein G is a guanidinate type group having the following structure:

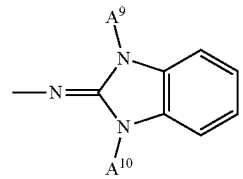

where $A^9$ and $A^{10}$ are independently a hydrogen, an acyclic or a cyclic hydrocarbyl group or an acyclic or a cyclic heteroatom containing hydrocarbyl group.

14. The phosphinimide pre-polymerization catalyst of claim 13, wherein $A^9$ and $A^{10}$ are alkyl groups.

15. The phosphinimide pre-polymerization catalyst of claim 14, wherein $A^9$ and $A^{10}$ are isopropyl groups.

16. The phosphinimide pre-polymerization catalyst of claim 14, wherein the L is a cyclopentadienyl ligand.

17. The phosphinimide pre-polymerization catalyst of claim 16, wherein $R^1$ is independently a hydrocarbyl group which is unsubstituted or substituted with one or more halogen atom.

18. The phosphinimide pre-polymerization catalyst of claim 17, wherein each $R^1$ is a tert-butyl group.

19. The phosphinimide pre-polymerization catalyst of claim 13, wherein M is Ti.

20. A polymerization catalyst system comprising:
i) a phosphinimide pre-polymerization catalyst having the following structure:

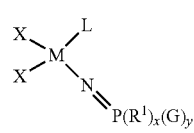

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group having the following structure:

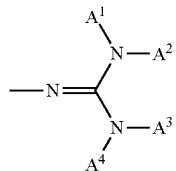

where $A^1$, $A^2$, $A^3$, and $A^4$ are independently hydrogen, an acyclic or a cyclic hydrocarbyl group, or an acyclic or a cyclic heteroatom containing hydrocarbyl group, and where any of $A^1$ to $A^4$ may be part of a cyclic hydrocarbyl group or a cyclic heteroatom containing hydrocarbyl group; x is 0, 1, or 2; y is 3, 2, or 1; and x+y=3; and ii) a catalyst activator.

21. A polymerization process comprising polymerizing ethylene optionally with one or more $C_{3-12}$ alpha olefins in the presence of a polymerization catalyst system comprising:

i) a phosphinimide pre-polymerization catalyst having the following structure:

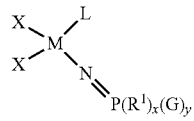

wherein M is Ti, Zr or Hf; P is phosphorus; N is nitrogen; L is a cyclopentadienyl type ligand; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; G is a guanidinate type group having the following structure:

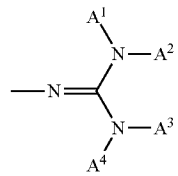

where $A^1$, $A^2$, $A^3$, and $A^4$ are independently hydrogen, an acyclic or a cyclic hydrocarbyl group, or an acyclic or a cyclic heteroatom containing hydrocarbyl group, and where any of $A^1$ to $A^4$ may be part of a cyclic hydrocarbyl group or a cyclic heteroatom containing hydrocarbyl group x is 0, 1, or 2; y is 3, 2, or 1; and x+y=3; and ii) a catalyst activator.

22. The polymerization process of claim 21, wherein the polymerization process is a solution phase polymerization process carried out in a solvent.

23. The polymerization process of claim 22, wherein the process comprises polymerizing ethylene with one or more $C_{3-12}$ alpha olefins.

24. The polymerization process of claim 23, wherein the process comprises polymerizing ethylene with 1-octene.

* * * * *